Oct. 7, 1952        F. O. HICKLING        2,613,090

GREASE SHIELD FOR ANTIFRICTION BEARINGS

Filed Nov. 18, 1948        2 SHEETS—SHEET 1

INVENTOR
Frederick O. Hickling
BY
ATTORNEY

Oct. 7, 1952          F. O. HICKLING          2,613,090
GREASE SHIELD FOR ANTIFRICTION BEARINGS
Filed Nov. 18, 1948          2 SHEETS—SHEET 2

INVENTOR
Frederick O. Hickling
BY
ATTORNEY

Patented Oct. 7, 1952

2,613,090

UNITED STATES PATENT OFFICE 2,613,090

GREASE SHIELD FOR ANTIFRICTION BEARINGS

Frederick Osgood Hickling, West Bridgford, Nottingham, England, assignor to Ransome and Marles Bearing Company Limited, Nottingham, England, a British company Application November 18, 1948, Serial No. 60,806
In Great Britain September 1, 1947

7 Claims. (Cl. 286—5)

This invention relates to improvements in anti-friction bearings and particularly to improvements in sealing means for such bearings to prevent the entrance of foreign matter into the bearings and leakage of lubricant.

Heretofore in anti-friction bearings comprising an inner ring and an outer bearing ring having tracks for balls or rollers, the said rings have been extended in width on one or both sides of the rolling tracks and ground to provide seating surfaces for a grease shield or seal, a groove being formed in the ground surface of one of the rings on one or both sides of the track, the said grease shield or seal being in the form of a ring of substantially L shape in cross section, the periphery of the L shaped ring being of a diameter to fit the ground surface of one of the rings and so arranged in the bearing that the whole periphery or substantially the whole periphery of the said shield or seal is in contact with the surface of one of the bearing rings so that the said shield or seal will be definitely concentrically located with the other ring of the bearing, the outer edge of the L shaped ring being circumferentially curved or pressed outwardly to provide locating means adapted to be positioned in the groove formed in one of the said bearing rings.

It has been found in practice that certain difficulties arose in fitting grease shields or seals of this kind as the interference fit of the shield and tolerances which of necessity had to be allowed for made the fitting difficult and caused buckling of the shield and the locating means in the form of an outwardly curved lip acting as a safety device did not give a lead in for assembling the shield in the bearing.

The object of the present invention is to provide a grease shield fitting which will overcome the above mentioned difficulties and to provide a grease shield or seal which will be held concentrically in the bearing by means of a push fit or a locating fit in the bearing, the shield being retained against axial movement by means of convex shape such as a circumferential rib or a series of convex shaped protrusions arranged around the periphery to co-operate with the groove in the bearing.

With this and other objects in view the invention is characterised in that the means of convex shape are formed or provided on the periphery of the grease shield or seal to co-operate with the groove to act as a safety device to prevent axial displacement of the said grease shield when fitted in the bearing, the periphery of the grease shield or seal being of such diameter as to have a push fit or a locating fit in or on one of the bearing rings. The periphery is so shaped as to give a lead in when it is assembled in the bearing.

The invention will now be described with reference to the accompanying drawings in which.

Figure 1:
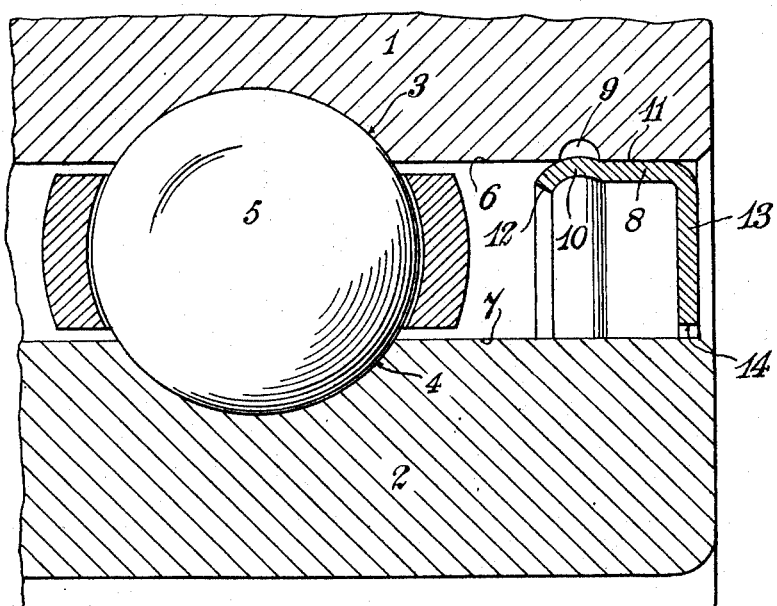
Figure 1 is a part sectional elevation of an anti-friction bearing having a grease shield fitted according to one form of this invention.
Figure 2:
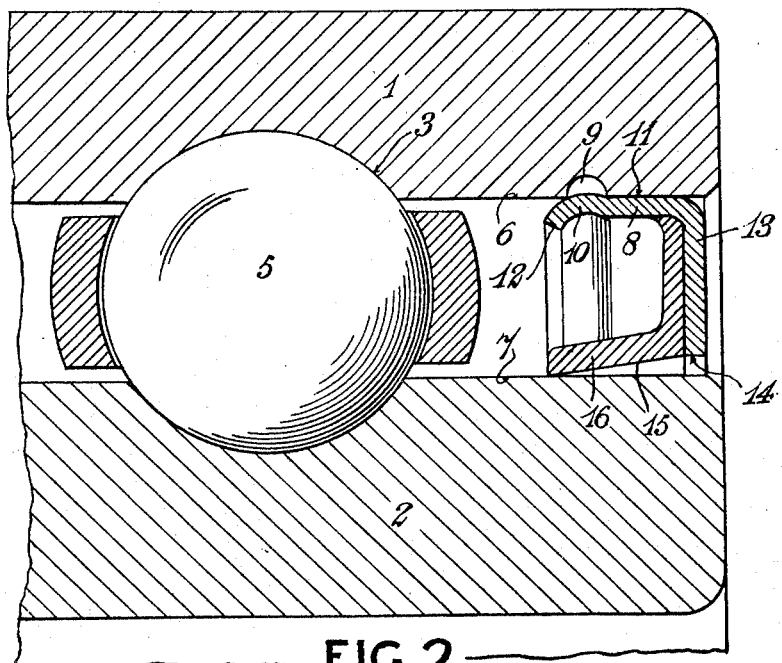
Figure 2 is a similar view showing a pad fitted to the grease shield.

As shown more particularly in Figure 1 the outer and inner bearing rings 1 and 2 respectively of an anti-friction bearing such as a ball bearing are extended in width on one or both sides of the rolling tracks 3 and 4 for the balls 5. These tracks 3 and 4 and the extended adjacent surfaces 6 and 7 of the rings 1 and 2 are ground so that ground seating surfaces will be provided for a grease or lubricating seal 8 which is inserted within the said extensions. Adjacent to the rolling track 3 of, for instance, the outer ring 1 is formed a groove 9 of substantially semi-circular, U or other convenient shape in cross section. This groove 9 is formed on one or both sides of the rolling track so that the ring-like shield or grease seal 8 may be fitted on one or both sides of the bearing as desired. This grease shield or seal 8 is of cup-like form of substantially L shape in cross section and formed with a retaining rim or lip 10 of convex shape on its periphery which is adapted to so co-operate with the groove 9 as to act as a safety device to prevent axial movement of the grease shield 8. The cylindrical portion 11 of the grease shield 8 is of such diameter as to have a push fit on the ground surface 6. Thus the grease shield 8 is maintained concentrically by the main body portion of the shield engaging the ground surface 6 and the curved rim only acts as a safety device for location purposes and to prevent any axial movement in use. The rib or lip 10 is extended inwardly at 12 and so curved as to give the shield or seal 8 a lead in when it is being assembled in the bearing. The inward extension 13 which is disposed at right angles to the ground surfaces is so arranged and formed with a bore 14 as to be just clear of the ground surface 7 of the inner ring 2 of the bearing. This shield 8 is preferably of drawn mild steel or of spring steel either of which may be heat treated or otherwise or of stainless steel. In the construction shown in Figure 2 the cup-like shield 8 is fitted in any suitable manner with a ring-like pad 15 or protection member of substantially L shape in cross section. This pad 15 is preferably formed of synthetic rubber or like material and moulded, clamped or vulcanized in position to the inward extension 13 of the shield 8. The width of the cylindrical portion 16 of the pad 15 is substantially equal to the depth of the cup-like shield 8 and may be conically formed as shown so that its inner edge only contacts with the ground surface 7 to provide a knife edge sealing lip and a satisfactory seal with the minimum amount of friction when in use. Alternatively the inward extension of this pad may be cylindrical and if desired slightly convexed or curved at its ends to facilitate assembly. It will be seen that in cross section the shield member 8 and the sealing pad 15 carried thereby forms three sides of a square with the opening facing the balls 5 or rollers of the bearing, one side or base of the square being formed by the thickness of the pad 15 and the thickness of the shield 8. It will be understood that the shield member as above described may be fitted at each side of the rolling track of a bearing and that the sealing ring or pad may be fitted or omitted as desired.

Figure 3:
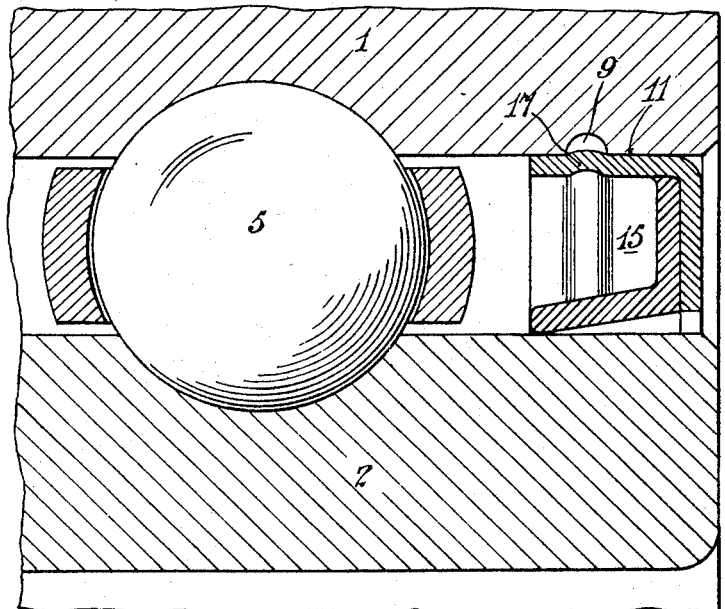
Figure 3 is a part sectional elevation of an anti-friction bearing showing a modified form of grease shield and Figure 4 is a similar view of a further modified construction.

In a modified construction as shown in Figure 3 the safety device instead of being in the form of a convex shaped rib or rim is in the form of a series of protrusions 17 of convex shape around the periphery. For instance three equally spaced protrusions 17 may be formed to engage in the groove 9 to prevent axial movement. The grease shield or seal is otherwise of similar construction to that previously described and the forward end may be inwardly curved to facilitate assembly.

Figure 4:
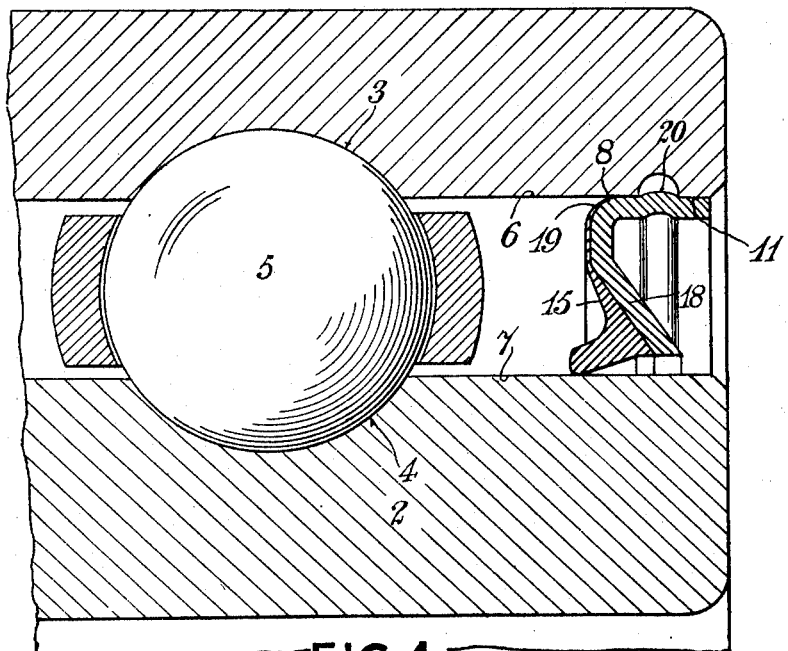

In a further modified construction as shown in Figure 4 the grease shield 8 is formed with a cylindrical portion 11 is of such diameter as to have a push fit or a locating fit in the outer ring 1 but the inwardly extending or radial wall is outwardly inclined or conically shaped as shown at 18 so that the shield 8 is of trough shape in cross section. The shield is curved at 19 to facilitate assembly and fitted with a pad 15 of substantially V shape in cross section vulcanized or clamped to the wall 18 as previously described. The safety device to prevent axial movement in this construction is conveniently in the form of a rib 20 of convex shape rolled to engage in the groove 9 preferably after assembly. Alternatively a series of convex shaped protrusions may be formed around the periphery as in the previous construction to act as a safety device. These protrusions being formed either before or after assembly.

The above described shields are adapted to be detachably fitted to the outer bearing ring but the construction may be varied for fitting to the inner ring 2. In this case the groove 9 for co-operating with rib or protrusions would be formed on the inner bearing ring 2 and the flange of the shield would be arranged radially outwardly to carry a sealing pad when it is desired to use a pad in conjunction with the shield.

What I claim is:

1. A bearing assembly comprising two relatively rotatable members, one of which is ground to provide a seating surface and has a circumferential groove in the ground surface, a grease shield seated around said ground surface and being in the form of a ring of substantially L shape in cross section to provide an axial sleeve engaging said ground surface and a radial flange substantially closing the space between said members, means of convex shape pre-formed on said axial sleeve of the grease shield and seated in said groove, said convex means being at least as wide as said groove to span said groove and engaging the side edges of said groove to prevent axial displacement of the said grease shield between said members, the periphery of the grease shield being of such diameter as to have an easy push fit with respect to said ground surface.

2. In a seal as claimed in claim 1 wherein said means comprises a circumferential rib on the axial sleeve portion of the grease shield.

3. In a seal as claimed in claim 1 wherein the means are in the form of a series of protrusions of convex shape spaced around the axial sleeve portion of the grease shield.

4. In a seal as claimed in claim 1 wherein said means of convex shape comprises a circumferential rib formation at the inner edge of said axial sleeve portion, the inner edge of said rib being curved back to give the shield a lead in when it is assembled between said members.

5. In a seal as claimed in claim 1 wherein the inner periphery of the grease shield is curved from said axial sleeve portion to give a lead in when it is assembled between said members.

6. In a seal as claimed in claim 1 wherein a ring like gasket member of substantially L shape in cross section is fitted to the shield to positively prevent the entrance of dirt between said members, said gasket including a radial portion secured to the radial portion of said sleeve, and an axially conical portion extending inwardly at the free edge of said shield radial portion to edge engagement with the free member.

7. In a seal as claimed in claim 1 wherein the grease shield is formed with a conical shaped radial portion to which is secured a ring-like pad of substantially V formation, one branch of which is secured to said seal and the other branch of which extends into edge engagement with the free member.

FREDERICK OSGOOD HICKLING.

REFERENCES CITED

The following references are of record in the file of this patent:

UNITED STATES PATENTS

| Number | Name | Date |
| --- | --- | --- |
| 1,358,634 | Hollander | Nov. 9, 1926 |
| 2,034,567 | Fernstrom | Mar. 17, 1936 |
| 2,185,339 | Hickling | Jan. 2, 1940 |
| 2,264,062 | Wilder | Nov. 25, 1941 |

FOREIGN PATENTS

| Number | Country | Date |
| --- | --- | --- |
| 98,579 | Sweden | of 1940 |
| 546,260 | Great Britain | of 1942 |